(12) United States Patent
Esau et al.

(10) Patent No.: US 7,806,091 B2
(45) Date of Patent: Oct. 5, 2010

(54) COOLING SYSTEM FOR A VEHICLE

(75) Inventors: Dierk Esau, Neuluβheim (DE);
Alexander Berg, Schauernheim (DE);
Gerald Werner, Edingen Neckarhausen (DE)

(73) Assignee: Deere & Company, Moline, IL (US)

( * ) Notice: Subject to any disclaimer, the term of this patent is extended or adjusted under 35 U.S.C. 154(b) by 324 days.

(21) Appl. No.: 11/596,628

(22) PCT Filed: May 13, 2005

(86) PCT No.: PCT/EP2005/052207

§ 371 (c)(1),
(2), (4) Date: Sep. 16, 2008

(87) PCT Pub. No.: WO2005/111392

PCT Pub. Date: Nov. 24, 2005

(65) Prior Publication Data

US 2009/0007857 A1    Jan. 8, 2009

(30) Foreign Application Priority Data

May 15, 2004 (DE) ........................ 10 2004 024 289

(51) Int. Cl.
*F01P 3/00* (2006.01)
(52) U.S. Cl. ................................. 123/41.29; 165/145
(58) Field of Classification Search ............. 123/41.29, 123/41.08, 41.09, 41.1, 41.31, 41.33, 41.44, 123/41.48, 41.56, 41.57, 196 AB, 563; 165/132, 165/145

See application file for complete search history.

(56) References Cited

U.S. PATENT DOCUMENTS

| 3,439,657 | A | * | 4/1969 | Gratzmuller | ................. 123/563 |
| 4,061,187 | A | * | 12/1977 | Rajasekaran et al. | ... 165/104.31 |
| 4,317,439 | A | * | 3/1982 | Emmerling | ................. 123/563 |
| 4,325,219 | A | * | 4/1982 | Stang et al. | .................... 60/599 |
| 4,885,911 | A | * | 12/1989 | Woollenweber et al. | ........ 60/597 |
| 5,215,044 | A | * | 6/1993 | Banzhaf et al. | ........... 123/41.29 |

(Continued)

FOREIGN PATENT DOCUMENTS

DE    1 451 901    5/1969

(Continued)

OTHER PUBLICATIONS

German Search Report, Oct. 11, 2006, 4 Pages.

*Primary Examiner*—Michael Cuff
*Assistant Examiner*—Hung Q Nguyen

(57) ABSTRACT

The invention relates to a cooling system for an internal combustion engine on a vehicle, preferably for an agricultural or industrial commercial vehicle. The cooling system includes a high temperature circuit and a low-temperature circuit. The high temperature circuit cools the internal combustion engine and includes at least a first cooler. The low temperature circuit cools a charge air cooler and, optionally, an oil cooler and includes at least one second cooler. The charge air cooler has at least two parts or stages. In the direction of flow of coolant in the low temperature circuit, the second cooler is connected downstream of a first part of the charge air cooler, the oil cooler and a second part of the charge air cooler. Alternatively or additionally, a further cooling circuit cools the charge air cooler and includes at least one cooler.

14 Claims, 2 Drawing Sheets

U.S. PATENT DOCUMENTS

Figure 1:
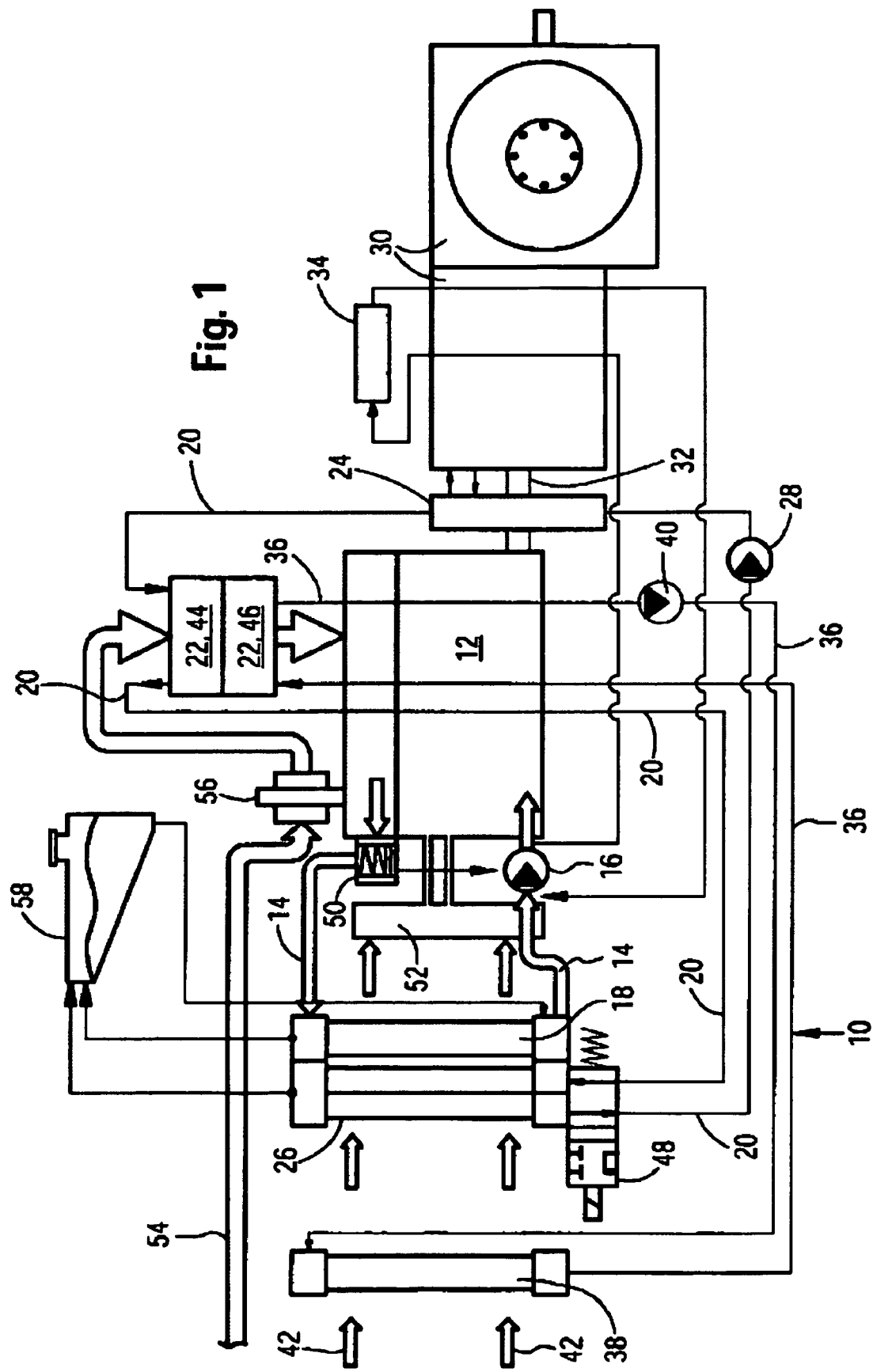

| | | | | |
|---|---|---|---|---|
| 5,394,854 | A * | 3/1995 | Edmaier et al. | 123/563 |
| 6,604,515 | B2 * | 8/2003 | Marsh et al. | 123/563 |
| 7,047,913 | B2 * | 5/2006 | Werner et al. | 123/41.33 |
| 2004/0050543 | A1 * | 3/2004 | Kim et al. | 165/202 |
| 2005/0178348 | A1 * | 8/2005 | Werner et al. | 123/41.33 |

FOREIGN PATENT DOCUMENTS

| | | |
|---|---|---|
| DE | 25 49 009 | 5/1977 |
| DE | 198 54 544 | 6/2000 |
| DE | 199 62 391 | 6/2001 |
| DE | 102 10 132 | 9/2003 |

* cited by examiner

COOLING SYSTEM FOR A VEHICLE

The present invention pertains to a cooling system for an internal combustion engine of a vehicle, preferably an agricultural or industrial utility vehicle, particularly a tractor. The cooling system has a high-temperature circuit and a low-temperature circuit. The high-temperature circuit is provided for cooling the internal combustion engine and has at least one cooler. The low-temperature circuit is provided for cooling an intercooler and, if applicable, an oil cooler, and has at least one cooler. The charge air cooler is divided into at least two sections or constructed with two stages.

Cooling systems of the type mentioned above are known, for example, from DE 41 14 704 A1. In this cooling system, an internal combustion engine and the charge air cooler are cooled in a high-temperature circuit with the aid of a high-temperature heat exchanger provided in this circuit. The temperature of the coolant in the high-temperature circuit, consisting of a liquid coolant in this case, lies at approximately 90 to 110 degrees Celsius. The charge air cooler as well as an oil cooler for transmission fluid are cooled in the low-temperature circuit that is realized separately from the high-temperature circuit, namely with the aid of a low-temperature heat exchanger provided in this circuit. The temperature of the coolant in the low-temperature circuit lies at approximately 45 to 90 degrees Celsius. The high-temperature heat exchanger as well as the low-temperature heat exchanger are embodied in the form of air-cooled heat exchangers and referred to as coolers below for reasons of simplicity.

Under certain operating conditions, however, the internal combustion engine cooled by the high-temperature circuit may operate at least briefly at a power that exceeds the designated maximum power of the internal combustion engine. This is the case, in particular, in vehicles that provide a so-called power boost, for example, as described in EP 1 239 133 A2. In such instances, the cooling system of the vehicle is stressed to its limits such that it may be overloaded and the internal combustion engine is damaged as a result thereof.

Consequently, the present invention is based on the objective of disclosing and further developing a cooling system of the type mentioned above that makes it possible to overcome the aforementioned problems. The invention aims, in particular, to increase the efficiency of the cooling system such that the risk of damaging the internal combustion engine can be eliminated by preventing the cooling system from being overloaded, even during a brief overload of the cooling system.

According to the invention, this objective is attained with the characteristics of Claims 1 and 4. Other advantageous embodiments and additional developments of the invention are disclosed in the dependent claims.

According to the invention, a cooling system of the initially cited type is characterized in that a section of the charge air cooler, the oil cooler and another section of the charge air cooler are arranged downstream of the cooler relative to the flow direction of the coolant of the low-temperature circuit.

The invention proposes, in principle, to divide the charge air cooler into at least two sections or to realize the charge air cooler with two stages, namely a high-temperature stage and a low-temperature stage. It would also be conceivable to divide the charge air cooler into multiple sections—e.g., three sections. This makes it possible to increase the efficiency of the charge air cooling, for example, in that the compressed charge air taken in from the surroundings can be initially cooled by the section that corresponds to the high-temperature stage of the charge air cooler. The charge air could then be additionally cooled by the section that corresponds to the low-temperature stage of the charge air cooler such that the overall cooling efficiency of the charge air cooler is improved. Consequently, it is no longer absolutely imperative to cool one stage or one section of the charge air cooler with the high-temperature circuit, whereby this constructive measure relieves the high-temperature circuit such that the cooling efficiency of the high-temperature circuit for the internal combustion engine can be increased.

The coolant of the low-temperature circuit is conveyed to the low-temperature stage of the charge air cooler by a coolant pump and then flows back to the coolant pump through the oil cooler, the low-temperature stage of the charge air cooler and the cooler of the low-temperature circuit. The cooler of the low-temperature circuit could feature, for example, an air-cooled heat exchanger. In other words, a section of the charge air cooler, the oil cooler and another section of the charge air cooler are arranged downstream of the cooler relative to the flow direction of the coolant of the low-temperature circuit. Consequently, the charge air cooler that is divided into two sections or realized with two stages is assigned to one and the same cooling circuit, namely the low-temperature circuit. When the cooler of the low-temperature circuit is short-circuited during a cold start of the vehicle, the low-temperature circuit can be used for transporting to the oil cooler the entire thermal energy transferred from the charge air cooler to the coolant of the low-temperature circuit. This makes it possible to advantageously reduce the time required for heating the oil flowing through the oil cooler and therefore the time until the vehicle is fully operational.

In a particularly preferred embodiment, a means is provided that enables the coolant in the low-temperature circuit to bypass the cooler of the low-temperature circuit such that only the charge air cooler and the oil cooler are functionally connected to one another in the low-temperature circuit. In general terms, a means is provided that enables the coolant in a circuit to bypass the cooler of the circuit. This is one of the aforementioned options for bypassing or short-circuiting the cooler of the low-temperature circuit.

This means could be embodied, for example, in the form of a changeover valve for conveying the coolant to be delivered to the cooler past the cooler, for example, via a bypass line. A functional connection between the charge air cooler and the oil cooler is practical, for example, with respect to the aforementioned operating state that predominates after a cold start of the vehicle. A purposeful increase of the oil temperature could be achieved, in particular, for the duration of the short-circuit or the bypassing of the cooler of the low-temperature circuit such that the temperature of the oil cooled by the oil cooler could be advantageously adjusted to a predetermined value, with a deviation of the predetermined temperature value being minimized due to the control. The bypassing means for the coolant could consist, in particular, of a conventional changeover valve according to the state of the art that is embodied, for example, as a 4/2-port directional control valve arranged on one side of the cooler, the coolant inlet as well as the coolant outlet of the cooler being situated on this side.

This makes it possible to solve a problem associated with cooling circuits according to the state of the art, namely the problem of only reaching the optimal operating state of the vehicle after a relatively long time, particularly after a cold start. For example, the temperature of the transmission fluid is only reached after the vehicle has been in operation for a relatively long time, so that the predetermined reaction periods of the hydraulic units, the valves and the clutches of the gearbox cannot be precisely maintained, at least in the warm-up phase.

In one preferred embodiment, the charge air cooler, the oil cooler and the cooler of the low-temperature circuit are connected in series.

The cooling capacity of the cooling system of the vehicle could be additionally increased in order to attain the initially cited objective. This is possible, in particular, because at least part of the exhaust gas discharged from the internal combustion engine is returned to the internal combustion engine in the form of combustion air. However, the exhaust gas has a higher temperature than the combustion air taken from the surroundings of the vehicle, so that the cooling capacity of the charge air cooler and the cooling capacity of the high-temperature circuit need to be increased in order to cool the internal combustion engine.

An increase in the cooling capacity of the cooling system of a vehicle could be achieved, in principle, by utilizing coolers with correspondingly larger dimensions. However, this requires additional space that is not always available in the region in which the cooler or the coolers of the vehicle are usually arranged.

The objective mentioned above is also attained with the characteristics of Claim 4. According to these characteristics, an inventive cooling system of the type mentioned above is characterized in that an additional cooling circuit is provided that also serves for cooling the charge air cooler and has at least one cooler.

It was initially recognized that an additional increase in the size of the existing coolers of the cooling circuits, namely the high-temperature circuit and the low-temperature circuit, is not always possible because the space available in a vehicle is generally limited. Therefore, the invention proposes that another cooling circuit featuring at least one cooler be provided. The cooler of the additional cooling circuit can be arranged at any location of the vehicle, so that the overall capacity of the cooling system consisting of three cooling circuits with three coolers can be significantly increased without substantially increasing the space requirement at the location of the vehicle at which the coolers are usually arranged. The cooling capacity of the cooling system can also be increased even if the coolers of the three cooling circuits are arranged adjacent to one another and require a larger structural space. Consequently, the internal combustion engine can be at least briefly operated with a power that exceeds its designated maximum power without the risk of overheating. Any extra cost for components of the additional cooling circuit is acceptable in this case because the inventive cooling system makes it possible to fulfill stricter exhaust gas regulations with respect to at least the cooling. In order to conform to stricter exhaust gas regulations, some of the proposed concepts utilize a cooling system with a higher cooling capacity than in the state of the art.

In one particularly preferred embodiment, at least two cooling circuits are constructed separately from one another, so that the coolant flowing through one cooling circuit is not mixed with the coolant flowing through the other cooling circuit. The coolant preferably consists of a liquid coolant, for example, a mixture of water and an antifreeze compound. Since the cooling circuits are realized separately from one another, they can be operated independently so that the vehicle is cooled in a particularly efficient fashion and the control/adjustment of the cooling system can be adapted to the respective operating state of the vehicle.

During a cold start of the vehicle, for example, the additional cooling circuit may be initially deactivated such that the heat transferred from the compressed charge air to the charge air cooler is carried off by the low-temperature circuit and directly transferred to the oil cooler that, in turn, heats the oil flowing through the oil cooler. The charge air cooler is one of the first units that heats up very quickly due to the compressed charge air in this operating state of the vehicle. However, this heat can be carried off due to the direct connection with the oil cooler and used for heating the oil flowing through the oil cooler. Therefore, the time required for heating the oil flowing through the oil cooler to its operating temperature can be advantageously reduced. In any case, it is not required to activate the additional cooling circuit in this operating state of the vehicle because the heat of the charge air cooler to be dissipated should be used almost exclusively for heating the oil flowing through the oil cooler.

Each of the respective cooling circuits must be provided with a coolant pump, particularly if at least two cooling circuits are constructed separately from one another. This extra expenditure for components also provides certain advantages. For example, the cooling circuit can be very easily activated or deactivated, e.g., by activating or deactivating the corresponding coolant pump. It is particularly practical to drive the coolant pump electrically if said coolant pump is designed to be activated and deactivated. An electrically driven coolant pump need not be arranged in the vicinity of the internal combustion engine, because no mechanical power transfer is required, for example, in the form of a V-belt drive. This advantageously provides certain design flexibilities with respect to the space available for the vehicle cooling system. In this case, the activation can be realized by producing the corresponding electric contact such that no mechanical clutch need be provided for decoupling the coolant pump, for example, from a V-belt drive. In addition, the separation of the coolant circuits advantageously makes it possible to carry out the cooling process efficiently and such that it is adapted to the respective operating state of the vehicle, with the cooling system also being able to react quickly to temperature changes of the vehicle units to be cooled. However, configurations of cooling systems in which only one coolant pump is provided are also conceivable, this coolant pump having separate pump chambers for simultaneously circulating the coolant of the two separate cooling circuits.

One cooler could have an air-cooled heat exchanger, in which case air originating from the surroundings preferably flows through this heat exchanger. In this respect, such a cooler consists of a conventional air-cooled heat exchanger according to the state of the art that transfers at least the majority of the thermal energy of the coolant to the air flowing through and around the heat exchanger.

In a preferred embodiment, one section of the charge air cooler that is divided into at least two sections can be connected to the low-temperature circuit and another section of the charge air cooler can be connected to another cooling circuit. If the charge air cooler is connected to the additional cooling circuit, the air flowing through the charge air cooler can be cooled to an even lower temperature than in instances in which the charge air cooler is cooled by the low-temperature circuit only. In this case, the additional cooling circuit could comprise only a section of the charge air cooler, the cooler of the additional cooling circuit and one of the coolant pumps. Such an arrangement would make it possible to cool and return the exhaust gas, discharged by the internal combustion engine and with a very high temperature, to the internal combustion engine in the form of combustion air. These measures furthermore make it possible to flexibly adjust the temperature of the charge air for the internal combustion engine to an optimal value in dependence on the instantaneous engine load.

Analogously, the oil cooler could be divided into at least two sections in order to be connected to two different cooling circuits. It is preferred that one section of the oil cooler be connected to the low-temperature circuit and another section of the oil cooler be connected to another cooling circuit, preferably to the additional cooling circuit. This advantageously also makes it possible to heat or cool the oil with the mixed temperatures corresponding to the division ratio of the oil cooler, so that the temperature of the oil can be controlled even more flexibly and better adapted to the respective operating state of the vehicle. It is practical that one section of the oil cooler has one-third of the oil cooler volume and the second section of the oil cooler has two-thirds of the oil cooler volume, wherein one section as well as the other section of the oil cooler could be respectively constructed such that it can be connected to the high-temperature circuit.

In one embodiment, the oil cooler can be connected to the high-temperature circuit only, particularly during the warm-up phase of the internal combustion engine of the vehicle. This primarily applies to the oil cooler responsible for cooling of the transmission fluid because hydraulic units, valves and clutches, in particular, are only able to observe the predetermined reaction periods if the transmission fluid has reached its optimal operating temperature. In this operating state, the cooler of the high-temperature circuit can preferably be isolated from the high-temperature circuit such that the coolant of the high-temperature circuit that has not yet reached its operating temperature is not additionally cooled by the cooler. This means that the high-temperature circuit is primarily utilized for heating the components connected thereto in this operating state and therefore represents an alternative to the short-circuit between the charge air cooler and the oil cooler.

In order to quickly connect and disconnect the units to be cooled to/from a cooling circuit, the conduit connections of the internal combustion engine, the oil cooler and, if applicable, the charge air cooler and/or at least one cooler of a cooling circuit can be connected and/or disconnected by means of at least one valve. This valve or these valves are preferably arranged in the cooling system such that the conduits can be realized as short as possible while still allowing a flexible allocation of at least the charge air cooler and/or the oil cooler to the respective cooling circuits.

Such a valve could feature a thermostat and/or be designed such that it can be actuated electrically or hydraulically. In addition, valves known from the state of the art could be used for this purpose, wherein electrically or hydraulically actuated valves are preferred for realizing an expeditious control.

In one particularly preferred embodiment, a control device and at least one temperature sensor for detecting the temperature of the coolant flowing through a cooling circuit are provided for controlling or adjusting the cooling system. For example, one temperature sensor could be arranged on the internal combustion engine, namely at the location at which the coolant of the high-temperature circuit is discharged from the internal combustion engine. Another temperature sensor could be arranged, for example, on the oil cooler in order to directly detect the oil temperature rather than the temperature of the coolant flowing through the oil cooler. Another temperature sensor could be arranged on the charge air cooler and preferably also detects the temperature of the charge air directly.

The temperature sensor generates—preferably electrical—signals that depend on the temperature of the coolant or the detected temperature, respectively. The temperature sensor forwards these signals to the control device. The control device could be realized, for example, in the form of a single-board computer. The control device compares the detected temperature to a predetermined temperature or a predetermined temperature range and actuates the valve or the valves and/or at least one coolant pump accordingly, so that a predetermined temperature range or a predetermined temperature value is observed.

The invention proposes, in principle, to arrange the coolers of the cooling circuits at a common location of the motor vehicle. According to one preferred embodiment, the coolers of at least two cooling circuits are essentially arranged in series. Air that preferably originates from the surroundings flows through these coolers in accordance with the sequence in which they are arranged. For example, the coolers of the high-temperature circuit and the low-temperature circuit could be arranged essentially one after the other within a common part of the vehicle. In this case, only the cooler of the additional cooling circuit is arranged at a different part of the vehicle.

In one particularly preferred embodiment, the sequence in which the coolers of at least two cooling circuits are arranged and the connection of these coolers to a unit to be cooled are chosen such that the cooling circuits form a countercurrent heat exchanger or operate in accordance with the countercurrent principle with respect to at least this unit. In this case, the coolers of the additional cooling circuit and the low-temperature circuit could be arranged, for example, in such a way that the cool ambient air initially flows through the cooler of the additional cooling circuit and then through the cooler of the low-temperature circuit after the heat of the cooler for the additional cooling circuit was transferred to the ambient air. Consequently, the coolant cooled by the cooler in the additional cooling circuit has a lower temperature than the coolant cooled by the cooler in the low-temperature circuit—at least with respect to the thermodynamic cooling capacity of the ambient air. A countercurrent heat exchanger is realized with this configuration, if the low-temperature circuit cools the section of the charge air cooler that is arranged upstream relative to the flow direction of the charge air and the additional cooling circuit cools the section of the charge air cooler that is arranged downstream relative to the flow direction of the charge air.

In instances in which the coolers of the cooling circuits cannot be arranged at a common part of the vehicle, for example, due to insufficient space being available at this part of the vehicle, the coolers of at least two cooling circuits may be arranged at different parts of the vehicle. The air currents flowing through the coolers can be spatially separated from one another in this case.

According to one preferred embodiment, one respective fan is assigned to at least two coolers, the fan blowing or taking in air through the associated cooler. It is particularly practical to assign a fan to each cooler if the coolers of at least two cooling circuits are arranged at different locations of the vehicle. The fan is preferably driven electrically, in which case the fan may be activated depending on the temperature. Because the fan is electrically driven, it is not necessary to provide a mechanical drive for driving the fan, for example, a V-belt drive.

Figure 2:
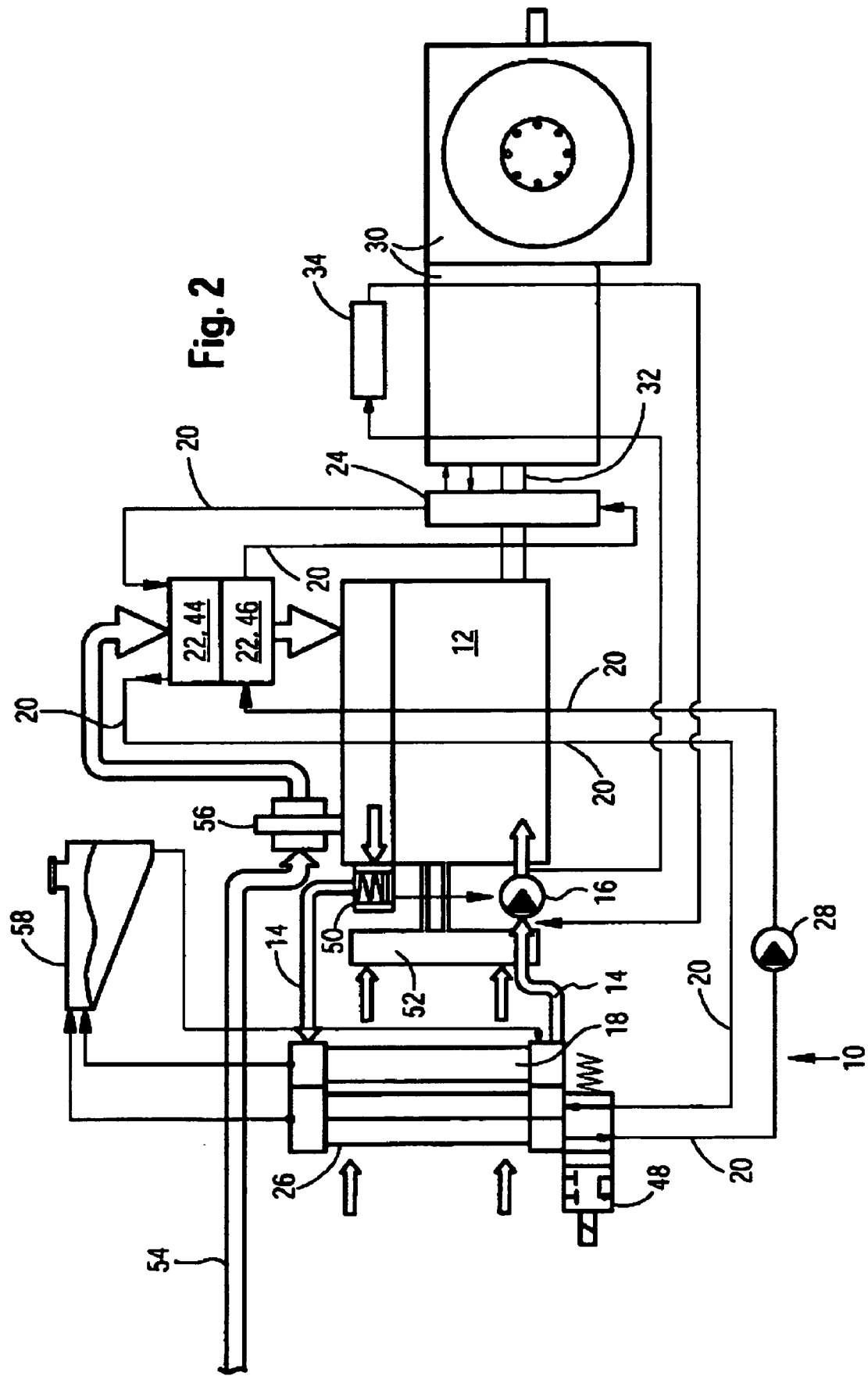

The characteristics of the present invention can be advantageously configured and additionally developed in different ways. In this respect, we refer to the claims that are dependent on Claim 1 as well as the description of preferred embodiments of the invention below, with reference to the drawings. Generally preferred configurations and additional developments of these characteristics are also described below in connection with the description of the preferred embodiment of the invention. In the schematic drawings, FIG. 1 shows an embodiment of an inventive cooling system, and FIG. 2 shows a second embodiment of an inventive cooling system.

In these figures, identical or similar components are identified by the same reference symbols. The cooling system 10 shown in FIGS. 1 and 2 is designed for a vehicle that is not illustrated in FIGS. 1 and 2. The vehicle consists, in particular, of an agricultural utility vehicle, namely a tractor.

The vehicle comprises an internal combustion engine 12 that is connected to the high-temperature circuit 14 of the cooling system 10. The high-temperature circuit 14 furthermore comprises a coolant pump 16 and a cooler 18. The vehicle comprises a low-temperature circuit 20 that has a charge air cooler 22, an oil cooler 24, a cooler 26 and a coolant pump 28.

The figures also show a gearbox 30, to which the torque generated by the internal combustion engine 12 is transmitted via the shaft 32. As schematically indicated, the heating unit 34 is connected to the high-temperature circuit 14 and serves for heating the vehicle cabin that is not illustrated in FIG. 1.

According to the invention, an additional cooling circuit 36 is provided for cooling the charge air cooler 22. The additional cooling circuit 36 comprises a cooler 38. The additional cooling circuit 36 also comprises a coolant pump 40.

The high-temperature circuit 14, the low-temperature circuit 20 and the additional cooling circuit 36 are constructed separately from one another, i.e., the coolants in the cooling circuits 14, 20 and 36 are not mixed. Therefore, one respective coolant pump 16, 28 and 40 must be provided for each cooling circuit 14, 20, 36.

The coolers 18, 26 and 38 in the three coolant circuits 14, 20 and 36 are each constructed as air-cooled heat exchangers, wherein air originating from the surroundings flows through these heat exchangers. The flow direction of this ambient air is indicated with arrows 42.

The charge air cooler 22 is divided into two sections in order to be connected to different cooling circuits 20, 36. The upper section 44 of the charge air cooler 22 is connected to the low-temperature circuit 20. The lower section 46 of the charge air cooler 22 is connected to the additional cooling circuit 36. The upper section 44 of the charge air cooler 22, the cooler 26, the coolant pump 28 and the oil cooler 24 are serially interconnected into the low-temperature circuit 20.

A 4/2-port directional control valve is provided for bypassing the cooler 26 of the low-temperature circuit 20. This is the case when the left part of the 4/2-port directional control valve is in the active position. In the position of the valve 48 shown in FIG. 1, the cooler 26 is connected to the low-temperature circuit 20. The cooler 18 of the high-temperature circuit 14 can be analogously isolated or short-circuited with the aid of the thermostatic valve 50. In this case, particularly after a cold start of the vehicle, the cooler 18 does not cool the internal combustion engine 12.

The coolers 38, 26 and 18 are spatially arranged behind one another, and air originating from the surroundings flows through these coolers in accordance with the sequence in which they are arranged—in the flow direction 42. This is achieved with the aid of the fan 52 that takes in the air through the coolers 38, 26 and 18.

The sequence in which the coolers 38 and 26 are arranged as well as the connection or cooling sequence of the two-section charge air cooler 22 are chosen such that the two cooling circuits 20, 36 form a countercurrent heat exchanger for the charge air cooler 22.

The combustion air 54 taken in from the surroundings is compressed with the aid of the turbocharger 56 and cooled to a temperature of approximately 45 degrees Celsius by the charge air cooler 22. The coolant reservoir 58 serves for filling and ventilating the high-temperature circuit 14 and the low-temperature circuit 20.

FIG. 2 shows a second embodiment of the vehicle cooling system that has a high-temperature circuit 14 and a low-temperature circuit 20. The high-temperature circuit 14 according to FIG. 2 essentially corresponds to that shown in FIG. 1. The low-temperature circuit 20 according to FIG. 2 comprises a cooler 26, a coolant pump 28, a first section 46 of the charge air cooler 22, the oil cooler 24 and a second section 44 of the charge air cooler 22. In this case, the coolant that is cooled by the cooler 26 of low-temperature circuit 20 is conveyed by the coolant pump 28 to the first section 46 of the charge air cooler 22 that forms the low-temperature stage of the charge air cooler 22. The coolant heated in this manner flows through the oil cooler 24, the additionally heated coolant then flowing through the high-temperature stage and the second section 44 of the charge air cooler 22 respectively, and then being conveyed to the cooler 26 in order to be cooled.

In closing, it should be explicitly pointed out that the above-described embodiments merely serve for elucidating the claimed characteristics, and that these characteristics are not restricted to the described embodiments.

The invention claimed is:

1. A cooling system for an internal combustion engine of a vehicle, wherein the cooling system has a high temperature circuit and a low temperature circuit, wherein the high temperature circuit cools the engine and includes a first heat exchanger, wherein the low temperature circuit cools a charge air cooler and an oil cooler and includes a second heat exchanger, and wherein the charge air cooler is divided into at least a first section and a second section, the improvement wherein:

the first section of the charge air cooler, the oil cooler and the second section of the charge air cooler are arranged downstream of the second heat exchanger relative to a flow direction of the coolant in the low temperature circuit, and wherein the coolant in the low temperature circuit flows in succession through the second heat exchanger, the first section of the charge air cooler, the oil cooler and the second section of the charge air cooler.

2. The cooling system of claim 1, further comprising:

a valve which enables coolant in the low temperature circuit to bypass the second heat exchanger so that only the charge air cooler and the oil cooler are connected to each other in the low temperature circuit.

3. The cooling system of claim 1, wherein:

the charge air cooler, the oil cooler and the second heat exchanger are serially connected to each other.

4. The cooling system of claim 1, further comprising:

an additional cooling circuit which cools the charge air cooler and which includes a third heat exchanger.

5. The cooling system of claim 4, wherein:

at least two of the cooling circuits are separated from each other so that coolant flowing through one cooling circuit is not mixed with the coolant flowing through the other cooling circuit.

6. The cooling system of claim 4, wherein:

each cooling circuit includes a corresponding coolant pump.

7. The cooling system of claim 6, wherein: one of the heat exchangers comprises an air cooled heat exchanger through which flows ambient air.

8. The cooling system of claim 4, wherein: one of the sections of the charge air cooler is connected to the low temperature circuit and another section of the charge air cooler is connected to third heat exchanger.

9. The cooling system of claim 1, wherein:
the oil cooler cools engine oil and transmission fluid.

10. The cooling system of claim 1, further comprising:
at least one valve for controlling communication between different components of the cooling system.

11. The cooling system of claim 10, wherein:
the valve includes a thermostat.

12. The cooling system of claim 10, further comprising:
a control device and a temperature sensor for detecting a temperature of coolant flowing through one of the cooling circuits, the valve being controlled by the control device in response to a signal generated by the temperature sensor.

13. The cooling system of claim 1, wherein:
the first and second heat exchangers of the cooling circuits are arranged at different locations on the vehicle, so that air currents flowing through the first and second heat exchangers are separated from one another.

14. The cooling system of claim 13, further comprising:
at least two electrically driven fans, each fan moving air through a corresponding first and second heat exchangers, and each fan is activated in a temperature controlled manner.

* * * * *